UNITED STATES PATENT OFFICE.

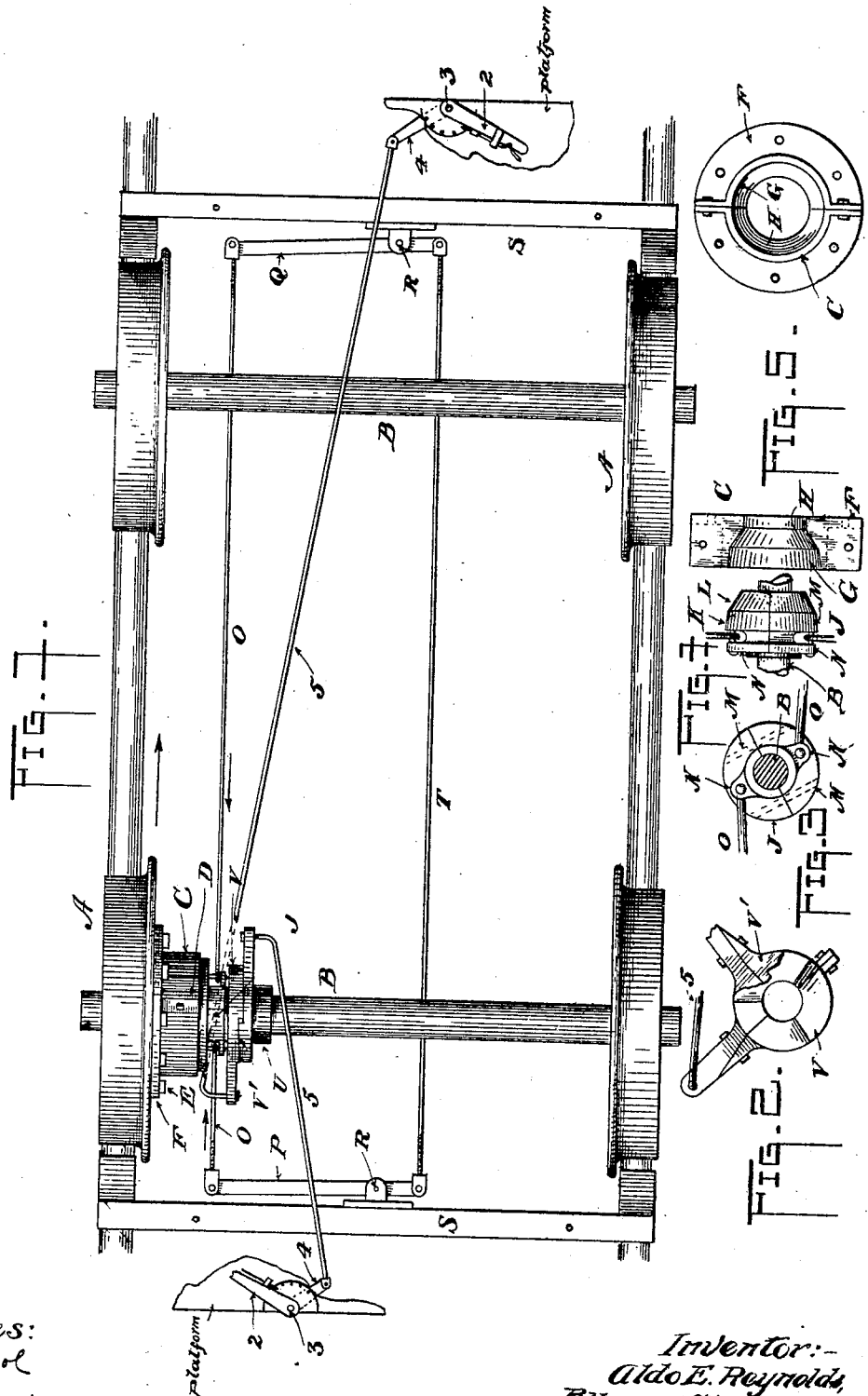

ALDO E. REYNOLDS, OF PEORIA, ILLINOIS, ASSIGNOR OF ONE-HALF TO ANDREW O'NEILL, OF PEORIA, ILLINOIS.

FRICTION-BRAKE.

No. 795,419.  Specification of Letters Patent.  Patented July 25, 1905.

Application filed December 27, 1904. Serial No. 238,493.

*To all whom it may concern:*

Be it known that I, ALDO E. REYNOLDS, a citizen of the United States, residing at Peoria, in the county of Peoria and State of Illinois, have invented certain new and useful Improvements in Friction-Brakes; and I do hereby declare that the following is a full, clear, and exact description of the invention, which will enable others skilled in the art to which it appertains to make and use the same.

This invention relates to friction-brakes.

The object of the present invention is to provide a friction-brake that will be simple in construction and operation and comparatively inexpensive.

A further object is to provide a brake construction wherein the strain or pull on the various parts will be equalized, so that there will be no detrimental binding of any of the bearing parts.

Furthermore, the object is to provide a construction that will give unlimited braking power without strain on the axle on which the device is mounted.

In my former patents, numbered 731,128 and 745,386, issued to me on the 16th day of June, 1903, and the 1st day of December, 1903, respectively, I have employed a friction-brake mounted on one of the axles of a car and employed a chain-winding drum on said axle, the revolution of which took up the chain to set the brake-shoes; but in the present instance the drum is dispensed with and other means substituted in which the strain put upon the brake-shoes is evenly divided and not put upon the axle in one direction, said means pulling from two directions. This, however, will be fully explained hereinafter.

In the appended drawings, forming part of this application, Figure 1 is a top view of the wheels and axles of a car removed from beneath the car and placed on rails, my improved brake mechanism being shown in connection therewith. Fig. 2 is a face view of a bevel-faced plate used for setting the brake, there also being part of a companion plate shown therewith. Fig. 3 is a face view of a friction member with which the brake-shoes are set. Fig. 4 is an edge view of the same. Fig. 5 is a side view of one-half of a friction member adapted to receive the member shown in Figs. 3 and 4. Fig. 6 is a face view of a friction member designed to turn with the car-axle.

The letter A indicates the four wheels of the car, and B B the axles thereof upon which the wheels are usually shrunk. Centrally mounted on one of the wheels, or rather with its periphery concentric with the peripheral surface of the axle, is a cupped friction member C, made in two portions, as indicated in Fig. 6, so that it may be placed around the axle, which, as before stated, is affixed in the wheel. Said member C is provided with lugs or ears D, whereby its two portions can be securely bolted together. This member is secured to the wheel by means of bolts E and the flange F and is bored out, as shown in Fig. 5, having two frictional surfaces. The first is preferably tapered inward at an angle of about ten degrees, as at G, and the other about twenty degrees, as at H, the latter angle being the inner one. Adjacent to the member C is a shifting cone J, having two angles K and L, corresponding with and adapted to engage those of the member C, just described. This cone is also made in two parts secured together by means of the bolts M. (Indicated in broken lines in Fig. 3.) Being made in two sections, the cone can be placed about the axle in proper relation to the internally-coned member C. The said cone J carries two extensions diametrically opposite the axle B, and to each is loosely connected a rod O, one of the latter having loose connection with one end of a lever P and the other likewise with a lever Q. Both said levers are pivotally connected with the beams S, which carry the usual brake-shoes S'. The said levers are fulcrumed at R to the said beams S and the free ends are connected by a rod T. Upon the axle a short distance from the cone J is secured a collar U, and between this collar and the cone are two plates V and V'. The adjacent faces of these plates are beveled, as shown in Fig. 1, and placed so that the movement of one against the other in turning upon the axle which carries it will act to separate said plates, and since the collar U on the shaft is fixed the separation of the plates must result in forcing the plate V toward the cone J, which latter receives said plate against a rim J' thereon. The movement of the plate V along the axle will thus force the cone J into the member C. The shaded lines on plate V, Fig. 5, also indicate the beveled faces above mentioned. However, this has been more fully shown and described in my former patent, No. 745,386, above referred to.

At each end of the car, at the usual place, is located a lever 2, carried on a vertical shaft 3, the lower end of the latter having an arm 4, between which and one of the plates V V' is a connecting-rod 5, it being seen that the rod 5, extending from one end of the car, passes beyond the axle and is connected to the plate at the farther side thereof, so that a pull on either rod serves to rotate the plate to which it is attached in a direction to cause the separation described and the consequent engagement of the friction members; but this has been fully described in my former patent, No. 745,386, referred to, and will be fully understood.

In operation the cone on being entered into the member C is made to firmly grip that member, and supposing the car to be moving toward the right, as indicated by the arrow, the cone will be revolved in that direction, thus moving the rods O toward one another in the direction of the arrows adjacent thereto. This at once draws the brake-beams toward the wheels, the rod T equalizing the pull. If the car is moving toward the left, the movement of the cone will be in that direction; but the rods O will be operated in the same manner as before.

It is to be noted that by means of the hand-lever 2 only sufficient pull is necessary to separate the plates V V' to push the cone J into the member C, the actual braking being done by the momentum of the car, which yields unlimited power to the friction apparatus. The advantage of having the rods O connected at each side of the axle to the partially-revoluble cone will be readily seen. There is no strain on the axle nor the bearings in which the axle is carried, for the reason that the pull is equalized. In using a chain to be wound upon a drum a great strain must result, since the pull is in one direction only; but by having this strain put upon two rods extending in opposite directions the disadvantages are at once completely overcome. Though not new, the two angles for the cones is of importance, in that the cone J cannot possibly enter and become fast, since the inner angle prevents this and the cone only remains within the member C, while the plates V V' hold it there. When the hand-lever 2 is released, the cone at once becomes freed and the car is able to start immediately. I provide notched quadrants at 6, with which the latches 7 engage. I have not shown any part of the car nor the supporting means for the vertical shafts 3, since that is fully shown in my former patent and, in fact, is no part of my present invention and is fully understood by those acquainted with matters of this character.

Evidently the member C could be carried on the axle as well as the wheel, and the positions of both friction members could be reversed; but the results would be the same. If the rods O were connected at the middle of the beams S, the levers P and rod T would not be necessary. If the member C were secured to the axle at about the middle, this could be done; but these are mere changes that would come within the scope of my invention.

In the use of each lever P attached at one of its ends to the middle of the brake-beams it will be noted that great leverage is had, since the long ends of the levers are those that have connection with the cone J by the rods O. Since the short ends of said levers are connected by the rod T, they are practically fulcrumed to a fixed support, and a pull occasioned by the turning of the cone, though it be a slight one, is multiplied at the point of connection with the levers and beams and brings the brake-shoes firmly against all of the wheels. I have stated that the cone with two angles is not new, for the reason that it has been used for bicycle friction-brakes; but it is new in connection with a street-car brake, being of much value when used therewith, since the angle L shown in the drawings is steeper than the angle K and must prevent the cone "sticking," as it will do if the angle K is used alone. The nearer the angle of a cone approaches the horizontal the more it is inclined to stick when entered into a revolving companion member. In consequence of this I have provided the two angles, the first for great friction and the second for preventing the inevitable sticking of the first. It often happens that with some cone-shifting structures the said cones cannot be separated after sticking even though such structure is provided for the express purpose of separating the cones; but in my device the cone J cannot possibly give this trouble, as it frees itself as the pressure is withdrawn therefrom, there being nothing required to release said cone. The opposing beveled-faced plates V and V' as arranged exert great pressure in forcing the cone into the member C and can be operated with ease both in entering the cone and in the movement to permit the cone to voluntarily release itself, so that actually a very efficient device is produced. The various leverages are simply arranged with the fewest parts and have ample, and, in fact, practically unlimited, power.

I claim—

1. In a brake of the class described, the wheels and axles for the car, a hollow friction member adapted to revolve with one of the wheels and its axle, the inner face of said member having two angles each of a different degree, a friction-cone carried loosely on the axle adjacent to the friction member and adapted for shifting along the axle, the axle turning therein, said cone having two angled faces to correspond with and engage the inner faces of the friction member as set forth, braking means for frictional engagement with the wheels, a connection pivoted to each diametrically opposite side of the cone and connected with the braking means for the purposes described and means for shifting the cone into engagement with the hollow friction member to set the braking means, said cone voluntarily releasing itself when the shifting means are retracted.

2. In a brake of the character described, the combination of the wheels and axles of the car, a hollow friction member secured to one of the wheels concentric with the axle, the inner surface of said member having two angles each of a different degree of inclination, a cone on the axle adapted to shift along said axle, and provided with two angled faces to correspond with and engage the inner faces or angles of the friction member, brake-beams for the car, a connection between the beams and the cone substantially as described and for the purposes set forth, a pair of plates on the axle adjacent to the cone and having beveled opposed and contacting faces adapted to shift the cone into the friction member by a rocking movement of either plate on the axle, said cone releasing itself when the plate is given a retracting movement substantially as described.

3. In a brake of the character described, the wheels and axles, and braking devices of the car, a cupped friction member secured to one of the wheels and having two angles in its friction-surface as described and shown, a friction-cone on the axle adjacent to said friction member and having two angles to correspond with and engage the surfaces of the cupped member, the cone shiftable along the axle, a fixed collar on the axle slightly removed from the vicinity of the cone, a pair of beveled plates lying between the cone and the collar and surrounding the axle, each arranged to partially turn on the axle and either one adapted by such turning movement to shift one of them against the cone and force that member into the cupped member, the cone freely releasing itself without aid from the shifted plate when that member is retracted, and connections between the cone and the braking devices for setting the brake-shoes when the cone is turned by the cupped member.

4. In a brake of the character described the combination of the wheels and axles of the car, of a cupped friction member secured to one of the wheels, the same having two coned faces of different angles, a loose cone on the axle adjacent to the said cupped member, said cone also having two coned surfaces to correspond with the angles of the cupped member as described, the brake-beams and their friction-shoes, a lever pivoted near one end to substantially the middle of each beam, a connecting member between the cone and the long end of each lever, a rod connecting the two short ends of the levers and means for shifting the cone into frictional engagement with the cupped member, said cone voluntarily releasing itself when the shifting means is withdrawn from pressure thereagainst.

5. In a friction-brake, the combination with the wheel and axle of a car, of a cup-cone revoluble with the wheel and axle, a cone carried on the axle but independent thereof, the axle turning therein, a brake-beam for each pair of wheels, connection between each brake-beam and the cone, and a pair of beveled-faced plates carried on the axle adjacent to the said cone for shifting the latter along the shaft into engagement with the cup-cone to impart a partial rotary movement to said cone to draw the brake-beam against the wheels and means at each end of the car for moving the beveled plates for the purposes described.

In testimony whereof I affix my signature in presence of two witnesses.

ALDO E. REYNOLDS.

Witnesses:
L. M. THURLOW,
E. J. ABERSOL.